United States Patent
Cervantes et al.

(10) Patent No.: US 10,075,357 B2
(45) Date of Patent: Sep. 11, 2018

(54) TRANSPORT OF TIME SENSITIVE INFORMATION USING THE INTERNET

(71) Applicant: VideoLink LLC, Newton, MA (US)

(72) Inventors: James Howard Cervantes, Lexington, MA (US); Michael Christopher Regan, Allston, MA (US)

(73) Assignee: VideoLink LLC, Newton, MA (US)

( * ) Notice: Subject to any disclaimer, the term of this patent is extended or adjusted under 35 U.S.C. 154(b) by 42 days.

(21) Appl. No.: 15/288,099

(22) Filed: Oct. 7, 2016

(65) Prior Publication Data

US 2017/0111252 A1 Apr. 20, 2017

Related U.S. Application Data (60) Provisional application No. 62/241,407, filed on Oct. 14, 2015.

(51) Int. Cl.
*H04L 12/26* (2006.01)
*H04L 1/08* (2006.01)
*H04L 12/715* (2013.01)
*H04L 12/841* (2013.01)

(52) U.S. Cl.
CPC ............ *H04L 43/0852* (2013.01); *H04L 1/08* (2013.01); *H04L 43/12* (2013.01); *H04L 45/64* (2013.01); *H04L 47/283* (2013.01)

(58) Field of Classification Search
CPC ..... H04W 64/00; H04W 24/08; H04W 16/18; H04W 88/02
See application file for complete search history.

(56) References Cited

U.S. PATENT DOCUMENTS

| | | | | |
|---|---|---|---|---|
| 7,940,685 B1* | 5/2011 | Breslau | ............... | H04L 43/0835 370/251 |
| 2005/0083848 A1* | 4/2005 | Shao | ...................... | H04L 45/00 370/238 |
| 2008/0062879 A1* | 3/2008 | Sivakumar | .......... | H04L 29/1249 370/235 |
| 2010/0165830 A1* | 7/2010 | Amir | ....................... | H04L 45/04 370/216 |

(Continued)

OTHER PUBLICATIONS

International Search Report and Written Opinion dated Dec. 19, 2016 in corresponding PCT application No. PCT/US16/55931.

*Primary Examiner* — Hassan Kizou
*Assistant Examiner* — Hector Reyes Ortiz
(74) *Attorney, Agent, or Firm* — Nields, Lemack & Frame, LLC (57) ABSTRACT

A system, which uses the internet to deliver time sensitive information, includes an overlay node, having a plurality of overlay nodes, which are used to deliver the time sensitive information. To better characterize the connection between a sending node and a receiving node, the sending node periodically requests each overlay node in the path between the sending node and the receiving node to force a retransmission of a packet, while also forwarding that same packet to the next overlay node. In this way, the delay associated with each link in the path can be quantified and recorded by the receiving node. Based on the observed transmission delays, the receiving node may determine an optimal buffer time. This buffer time is the amount of buffering performed at the receiving node prior to outputting the time sensitive information.

12 Claims, 6 Drawing Sheets

(56) References Cited

U.S. PATENT DOCUMENTS

2014/0295865 A1\* 10/2014 Fantaye ............ H04W 72/1226
                                                        455/450
2015/0109942 A1    4/2015 Nguyen et al.

\* cited by examiner

TRANSPORT OF TIME SENSITIVE INFORMATION USING THE INTERNET

This application claims priority from U.S. Provisional Patent Application Ser. No. 62/241,407, filed Oct. 14, 2015, the disclosure of which is incorporated herein by reference in its entirety.

BACKGROUND

The desire to use the internet to transport time sensitive information, such as video streams, is ever increasing. However, the internet operates using best effort protocols, and therefore, the time between the sender beginning transmission of a packet and the receipt of that packet by the destination is variable. In addition to uncertainty in the transmission time, there is also the possibility of lost or damaged packets, which require retransmission and/or error correction.

To address these issues, some applications introduce a large amount of buffering at the destination. In other words, if the data is a video stream, the destination may buffer many seconds of the video before beginning the presentation of this video stream. By introducing a large buffer, it may be possible to accommodate more jitter and more errors in the transmission.

However, there are issues associated with increasing the buffering at the destination. First, in the case of video playback, such as YouTube or other similar applications, users may grow impatient waiting for the video stream to buffer. Second, in applications that are bidirectional or interactive, such as FaceTime or Skype, for example, larger buffering increases the delay between the two parties, often frustrating the users participating in the call.

Therefore, it would be beneficial if there were a system and method to transmit and present time sensitive information without resorting to overly large buffers. Further, it would be beneficial if this system and method also allowed for typical retransmission delays.

SUMMARY

A system and method that uses the internet to deliver time sensitive information is disclosed. The system includes an overlay network, having a plurality of overlay nodes, which are used to deliver the time sensitive information. To better characterize the connection between a sending node and a receiving node, the sending node periodically requests each overlay node in the path between the sending node and the receiving node to force a retransmission of a packet, while also forwarding that same packet to the next overlay node. In this way, the delay associated with each link in the path can be quantified and recorded by the receiving node. Based on the observed delays through the overlay network, the receiving node may determine an optimal buffer time. This buffer time is the amount of buffering performed at the receiving node prior to outputting the time sensitive information.

BRIEF DESCRIPTION OF THE FIGURES

For a better understanding of the present invention, reference is made to the accompanying drawings, which are incorporated herein by reference and in which.

DETAILED DESCRIPTION

When time sensitive information is delivered, it is often buffered at the receiving node, so that its presentation to the user is smooth and jitter free. For example, when a video stream is delivered, several seconds (or more) of that video are buffered by the receiving node before any of the video is presented. This buffer time is used to account for inconsistency in transmission time between the sending node and the receiving node, and also to account for possible retransmission.

Determining an appropriate buffer time is difficult. If the buffer time is too short, the user may still see the effects of inconsistent transmission delays and retransmissions. If the buffer time is too long, the user may be dissatisfied in the delay between pressing "PLAY" and the actual commencement of the video. Further, as noted above, in applications where time sensitive information is sent in both directions, such as Skype or Facetime, the delay may have a serious impact on the user experience.

The present system characterizes and quantifies major sources of jitter and variability, and uses these quantified values to determine an optimal buffer time.

Figure 1:
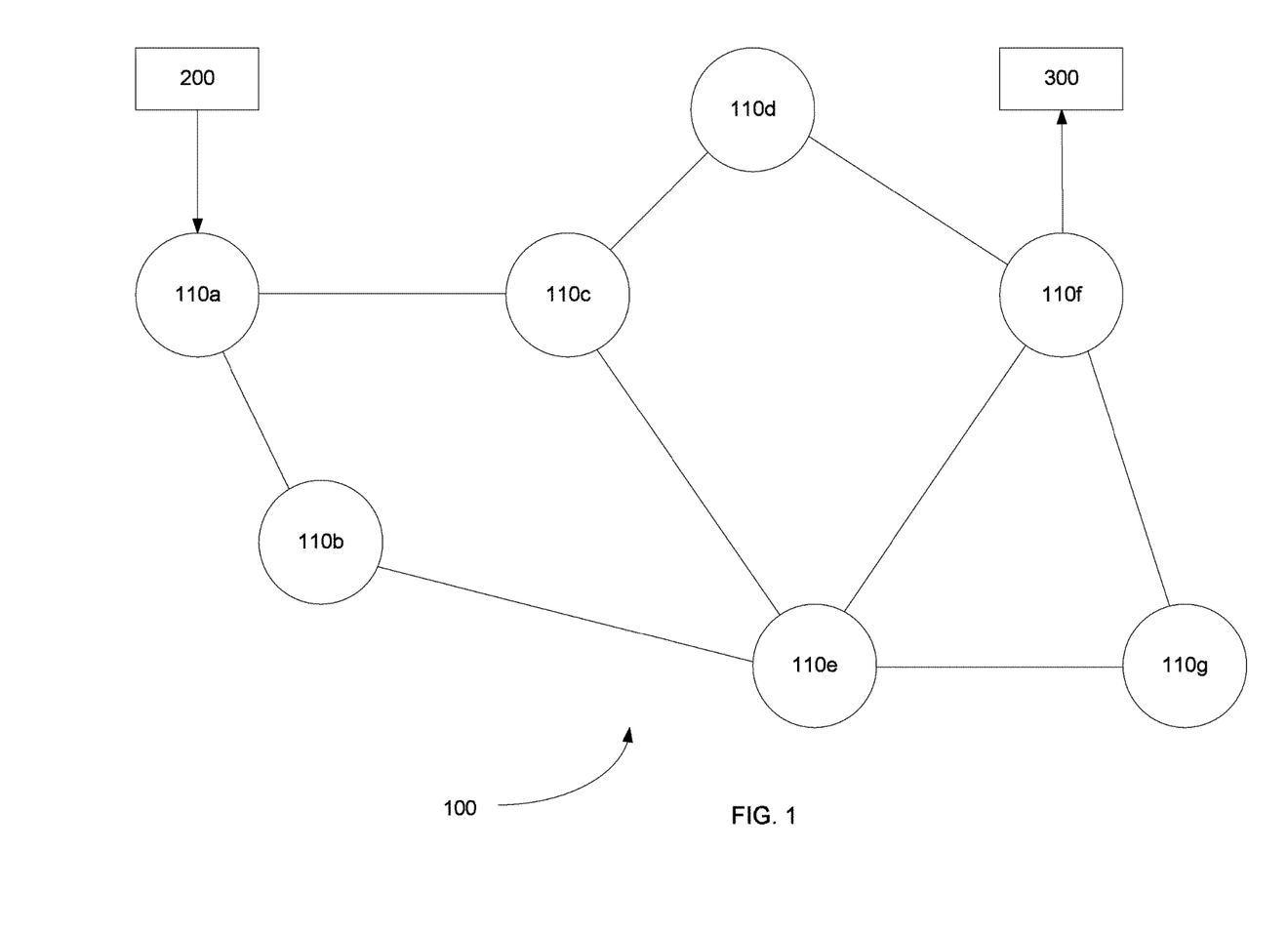
FIG. 1 is an illustration of the system according to one embodiment.

FIG. 1 shows a typical system 100 that may be used according to one embodiment. The system includes a sending node 200, and a receiving node 300. These nodes communicate through an overlay network, comprised of a plurality of overlay nodes 110a-g. The overlay network operates on top of the internet.

In the internet, the TCP protocol is used to create a connection between a source and a destination, where these two nodes are the only nodes that track sequence numbers and packet loss. In other words, if packets 1-5 are to be delivered from a source node to a destination node over the internet using TCP, only the destination node checks these sequence numbers to determine if all packets arrived successfully. If a packet was lost, only the destination node and the original source are able to identify the need for retransmission. In other words, the intermediate nodes do not track whether all packets and sequence numbers are transmitted to the destination.

In contrast, in the overlay node shown in FIG. 1, sequence numbers are tracked privately between each pair of adjacent overlay node 110a-g. Thus, assume a set of packets is sent from the sending node 200 to the receiving node 300. These packets may pass through overlay nodes 110a, 110c, 110e and 110f. If overlay node 110e determines that a packet was lost, it will request retransmission of that packet from the previous overlay node 110c. In this way, the effects of a lost packet, and specifically, the delay attributable to retransmitting the packet, are made smaller, as the loss is identified sooner and the retransmission travels a smaller distance.

In one particular embodiment, packets are delivered through the overlay network using UDP (user datagram protocol) to communicate between overlay nodes 110a-g.

Figure 2:
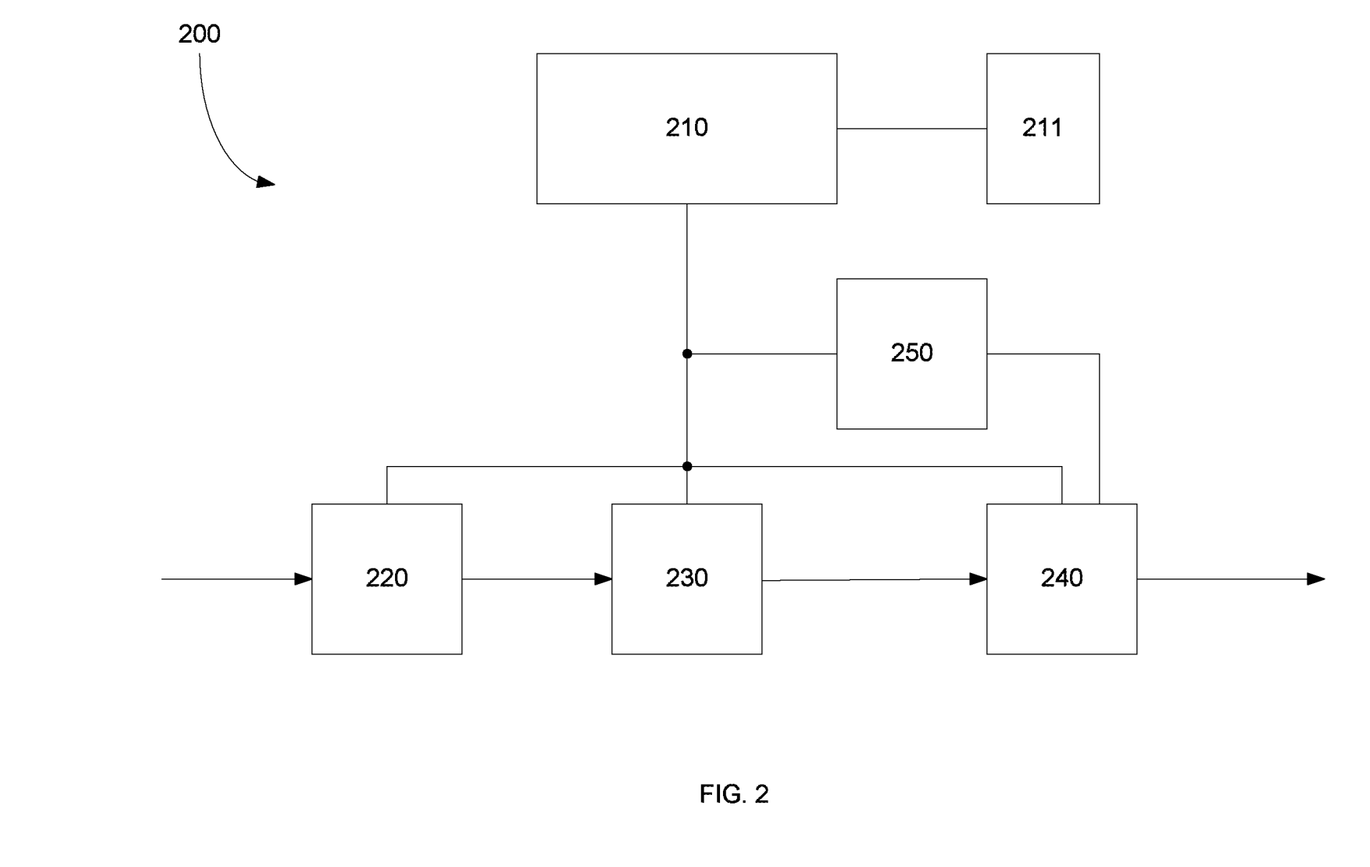
FIG. 2 is a block diagram of the sending node.

In one embodiment, shown in FIG. 2, a H.264 video/AAC audio source 220 may be disposed proximate or within the sending node 200. This H.264 video/AAC audio source 220 may output a constant bit rate (CBR) transport stream for transmission to a destination. This CBR transport stream is delivered to a packetizing block 230. The packetizing block 230 converts the CBR transport stream into a series of discrete packets. Additionally, the packetizing block 230 may also add erasure correction codes. In one particular embodiment, forward erasure correction (FEC) is used, whereby additional redundant packets are added to the original packets. For example, for every 10 original packets, 3-7 redundant packets may be created and transmitted with the original packets. The redundant packets allow for the reconstruction of the original packets in the event that one or more of the original packets are lost during transmission. In certain embodiments, the packetizing block 230 may be special purpose hardware designed to perform these functions. In other embodiments, the packetizing block 230 may be a software application executed by the processing unit 210.

The packets created by the packetizing block 230 are then forwarded to the network interface 240, which transmits these packets over the internet, using the overlay network. The network interface 240 may be a hardware component, such as a NIC (network interface card), or may include a hardware component in conjunction with software executed by the processing unit 210.

The sending node 200 also includes a forced retry block 250, in communication with the network interface 240. The forced retry block 250 is used to flag certain packets for forced retransmission, as will be described in more detail below.

The sending node 200 may comprise a processing unit 210. The processing unit 210 may be any suitable device, such as a PC, server, special purpose controller or the like. In certain embodiments, multiple processing units may be used. The processing unit 210 is in communication with a memory 211, which contains the instructions, which when executed by the processing unit 210, perform the functions described herein. In certain embodiments, the processing unit 210 is in communication with the H.264 video/AAC audio source 220, the packetizing block 230, the network interface 240 and the forced retry block 250. In other embodiments, the processing unit 210 may not be in communication with one or more of these components.

While FIG. 2 shows a H.264 video/AAC audio source 220, other sources of time sensitive information may also be employed and the disclosure is not limited to this embodiment.

Figure 6:
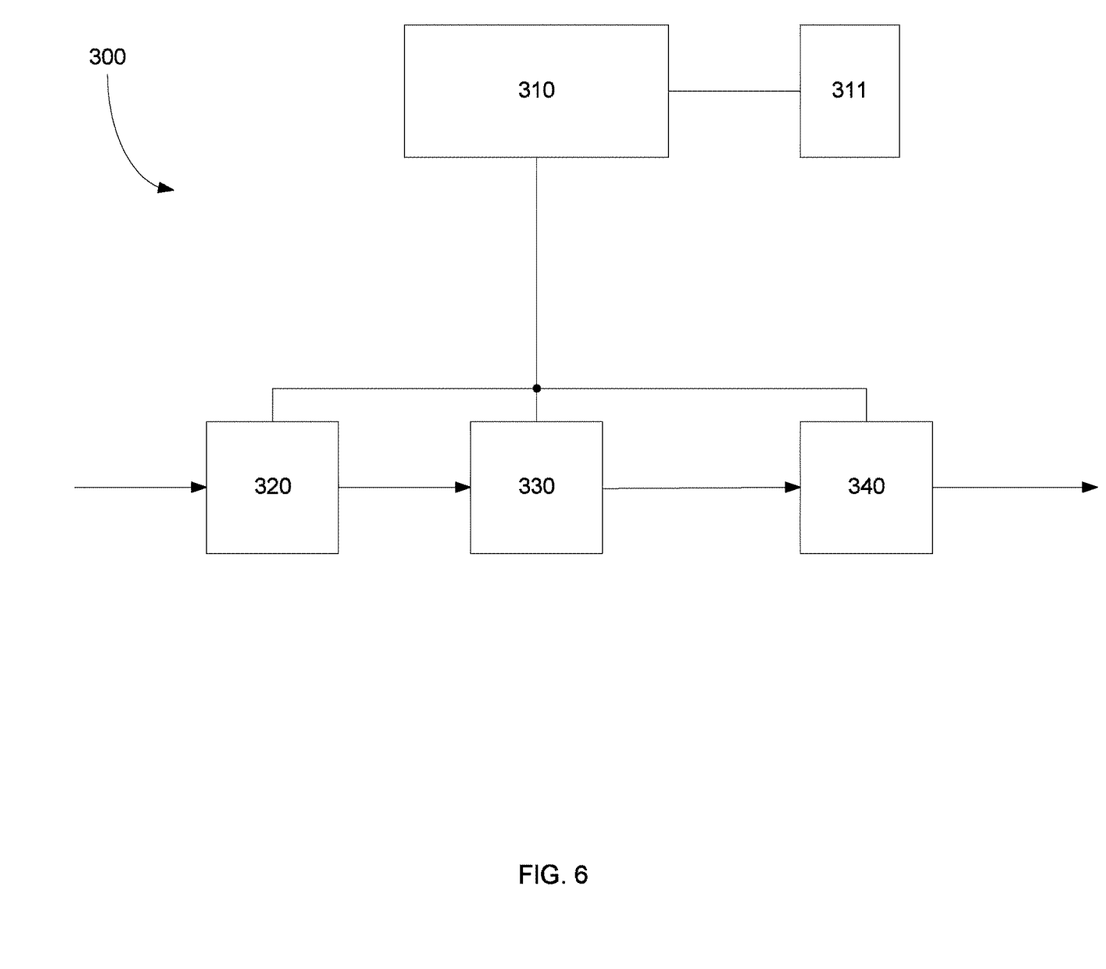
FIG. 6 is a block diagram of the receiving node.

FIG. 6 shows a receiving node 300. The receiving node 300 comprises a processing unit 310. The processing unit 310 may be any suitable device, such as a PC, server, special purpose controller or the like. In certain embodiments, multiple processing units may be used. The processing unit 310 is in communication with a memory 311, which contains the instructions, which when executed by the processing unit 310, perform the functions described herein.

The receiving node 300 also comprises a network interface 320, which through the incoming packets arrive. The network interface 320 may be a hardware component, such as a NIC (network interface card), or may include a hardware component in conjunction with software executed by the processing unit 310.

Further, the receiving node 300 comprises a calculation block 330. The calculation block 330 may include a clock function, such that the arrival time of all incoming packets can be determined. The calculation block 330 may also include the logic necessary to decode portions of the incoming packets so as to determine and store the delay associated with each link on the overlay network, as described in more detail below. The calculation block 330 may be a software application executed by the processing unit 310. In other embodiments, it may be a specialized hardware component.

Finally, the receiving node 300 also comprises a packet scheduler 340 that is responsible for arranging the incoming packets in the proper sequence prior to presentation. The packet scheduler 340 may include a memory element, which is used to store the properly arranged packets prior to presentation.

Although not shown, the receiving node 300 may also comprise a presentation block, in communication with the packet scheduler 340, to display the time sensitive information. For example, a video decoder may be used as part of the presentation block. As packets are transmitted from the packet scheduler 340, they may be decoded and displayed using the presentation block.

The calculated optimal buffer time is used by the packet scheduler 340 to determine how many packets to store before transmitting to the presentation block. A larger buffer time implies that more packets will be stored within the packet scheduler 340.

Each of the network interface 320, the calculation block 330 and the packet scheduler 340 may be in communication with the processing unit 310. In other embodiments, one or more of these components may not be in communication with the processing unit. The operation of the receiving node 300 is described in more detail below and in conjunction with FIG. 5.

Referring to FIG. 1, the sending node 200 transmits UDP packets over the overlay network. As described above, packet loss, jitter and delay are all unpredictable in the overlay network. The goals of the system 100 are to deliver the time sensitive information in as little time as possible (i.e. lowest latency) while protecting it from packet loss and temporal distortion (i.e. delay variability or jitter).

At the distal end, the receiving node 300 receives the packets transmitted by the sending node 200. Delivery time uncertainty and packet loss complicate the function of the receiving node 300. Specifically, when retransmissions occur, packets may arrive later than expected and may also arrive out of order. For example, the sending node may transmit packets 1-5. However, due to retransmissions and other communications issues, the packets may arrive at the receiving node 300 in a different order, such as 1, 2, 4, 5, 3. It is one of the functions of the receiving node 300 to reorder these packets. Additionally, since packet 3 must be displayed after packet 2, the receiving node 300 must also provide sufficient buffering to allow packet 3 to arrive before presenting this data to the user. In other words, the receiving node 300 must store a certain amount of information internally, such as within the packet scheduler 340, before outputting this information.

Calculating the amount of time to buffer a given packet is difficult. One choice is to choose an amount of time that will permit the link in the overlay network with the longest round trip time (RTT) to generate a retransmission that will reach the receiving node in time. Unfortunately, since the overlay network is disposed on the internet, timing can be notoriously variable, due to spontaneous routing updates and changes in line conditions and congestion.

Therefore, it would be beneficial to address these issues and calculate the retransmission delay associated with each link in the overlay network.

In one embodiment, certain packets are specially marked as retransmission probes. The forced retry block 250 (see FIG. 2) modifies the header of a particular packet to mark it for special processing. The frequency at which these retransmission probes are generated is variable, and is not limited by this disclosure. However, in certain embodiments, retransmission probes may be generated every 250 ms.

These retransmission probes may be regular packets that are specially marked. When a retransmission probe reaches an overlay node, that particular overlay node forwards the specially marked packet to the next overlay node, but also requests a retransmission of that packet from the overlay node from which it was sent.

Figure 3:
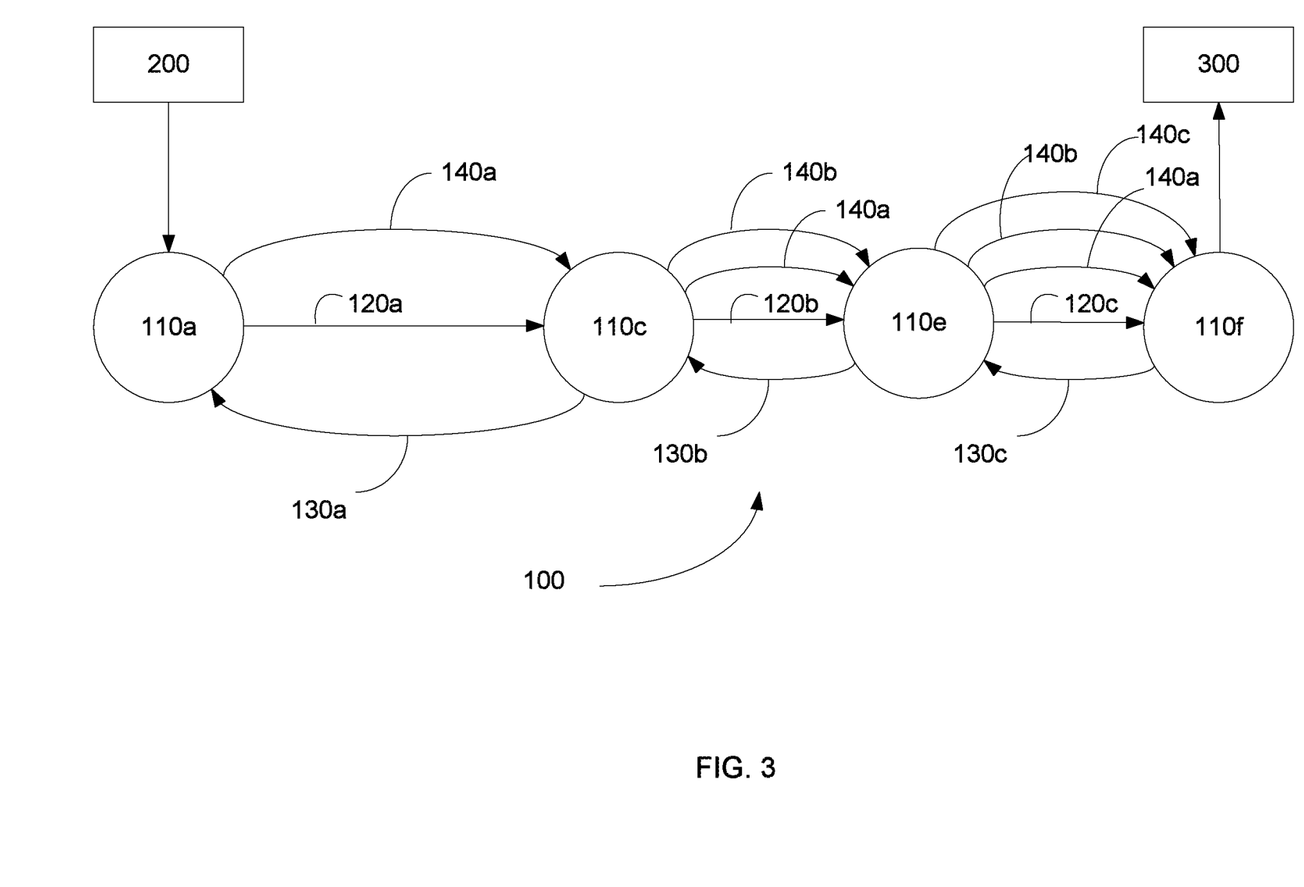
FIG. 3 is an illustration showing the retransmissions that are performed.
Figure 4A:
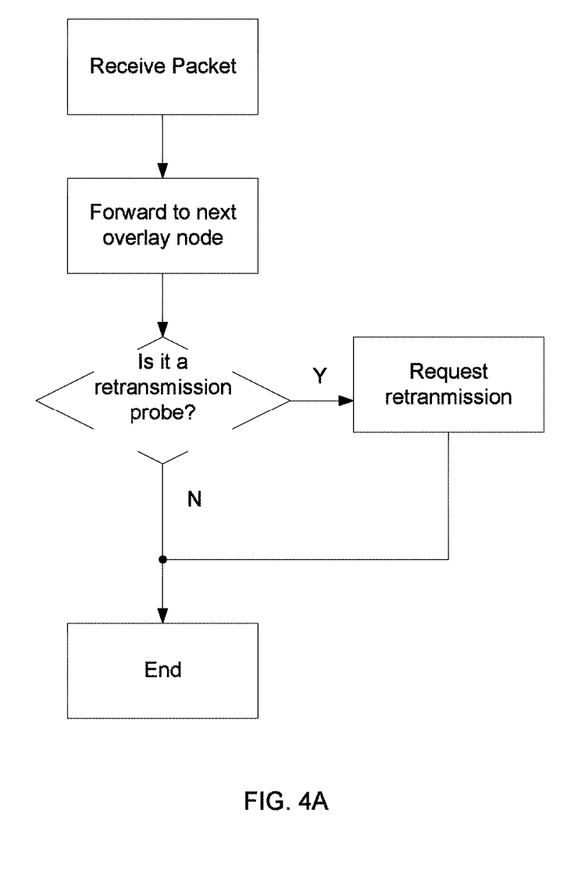
FIGS. 4A and 4B are flowcharts of processes performed by the overlay nodes.

The flow of packets is best seen in FIG. 3. In this example, the path between sending node 200 and receiving node 300 is through overlay nodes 110a, 110c, 110e and 110f. Normal packets traverse this overlay network using links 120a, 120b and 120c, where a link is used to connect two adjacent overlay nodes. However, retransmission probes are treated differently. Overlay node 110a sends a retransmission probe to overlay node 110c over link 120a, as is typically done. Overlay node 110c, seeing that the received packet is a retransmission probe, sends a request for retransmission 130a back to overlay node 110a. This process, executed by each overlay node, is shown in FIG. 4A.

Figure 4B:
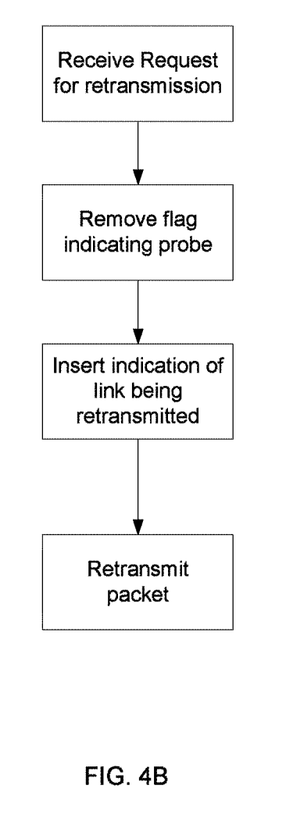

In response, the overlay node 110a sends a retransmission 140a to overlay node 110c. Note that the special marking that indicated that this is a retransmission probe is removed before the retransmission 140a is sent. The overlay node 110a may also indicate an indication in the retransmission 140a of the link over which the retransmission was sent. This process, which is executed by each overlay node, is shown in FIG. 4B.

Thus, overlay node 110c receives two packets from overlay node 110a; a retransmission probe and a retransmission 140a indicating that the retransmission was over link 120a. Overlay node 110c forwards both of these packets to overlay node 110e over link 120b.

When overlay node 110e receives the retransmission probe, it sends a request for retransmission 130b back to overlay node 110c. Overlay node 110e also forwards the retransmission probe to overlay node 110f.

Further, the overlay node 110e also forwards the retransmission 140a to overlay node 110f.

After receiving the request for retransmission 130b, overlay node 110c sends a retransmission 140b to overlay node 110e. Note that the special marking that indicated that this is a retransmission probe is removed before the retransmission 140b is sent. The overlay node 110c may also include in the retransmission 140b an indication of the link over which the retransmission was sent.

Thus, overlay node 110e receives three packets: the retransmission probe over link 120b; a first retransmission 140a indicating that the retransmission was over link 120a, and a second retransmission 140b indicating that the retransmission was over link 120b. The overlay node 110e forwards all three of these packets to the overlay node 110f.

Overlay node 110f repeats this process by forwarding the retransmission probe, sending a request for retransmission 130c and forwarding retransmissions 140a, 140b and 140c.

Thus, when complete, a retransmission probe will generate N+1 packets, where N is the number of links traversed by the packet. All of these packets are delivered to the receiving node 300.

The receiving node 300 is then able to estimate the delay caused by retransmissions on each of the links in the overlay network. Basically, the receiving node 300 will receive the retransmission probe first. The receiving node 300 notes the time of receipt of this retransmission probe. Note that this time need not be at all related to the time used by any other node in the overlay network. In certain embodiments, the receiving node 300 may compute the time through the network, which is representative of the time consumed by the packet as it traversed through the network, offset by the difference in the clocks (i.e. clock skew) at the sending node and the receiving node. This may be based on its receipt time, less the timestamp applied to the packet by the original sending node 200. In other words, the receiving node 300 may compute:

$Time_{inNetwork} = T_{receiver} - T_{sender}$, where $T_{receiver}$ is correlated to the clock at the receiving node 300, and $T_{sender}$ is a timestamp in the packet. This calculated value, also referred to as "time in network" is a measure of the time that the packet was actually traversing the network and also includes a offset to account for the difference in the receiver clock and the sender clock.

As each packet arrives at the receiving node 300, the time in network of that packet is calculated. In certain embodiments, the time in network of all packets that are not retransmissions are used to compute a smoothed time in network.

As each of the retransmissions 140a-140c arrives at the receiving node 300, the receiving node 300 notes the time of receipt of each of these retransmissions. Again the time in network for each retransmission 140a-140c may also be computed. Finally, by subtracting the smoothed time in network from the time in network for each retransmission, the delay associated with each link may be calculated. Importantly, because each link delay is calculated as a difference, the offset between the sending node clock and the receiving node clock is eliminated.

Figure 5:
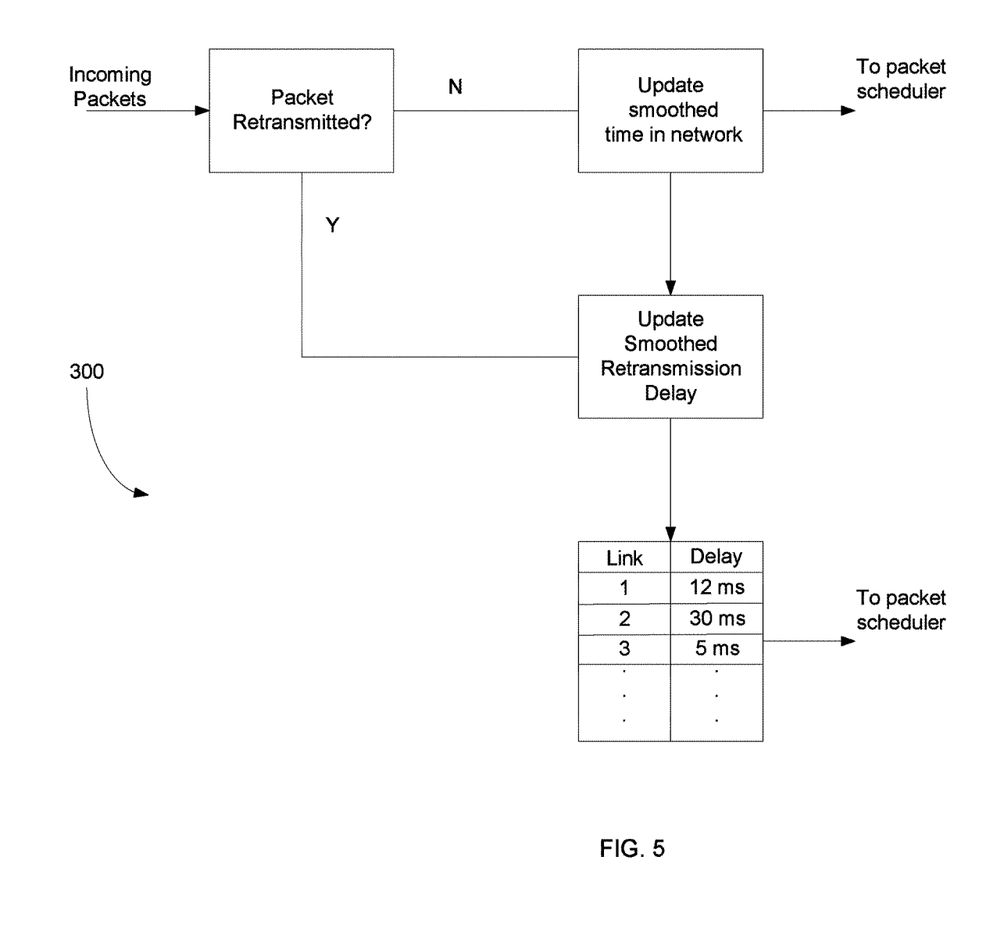
FIG. 5 shows the flow of information in the receiving node.

FIG. 5 pictorially shows this process. As incoming packets are received by the receiving node 300, the receiving node 300 checks to see if it was a retransmitted packet. If it was not retransmitted, the receiving node 300 calculates the time in network, such as by using the equation shown above, and updates the smoothed time in network. In other embodiments, only the arrival time, as recorded by the receiving node 300, is saved. The packet is then forwarded to the packet scheduler 340 to be inserted in the output queue. Thus, calculations of the time in network value are performed for all packets that are not retransmissions. These time in network values may be used to create a smoothed time in network. This smoothed time in network represents the time difference between the time the packet was transmitted by the sending node 200 (based on the sending node's clock) and the time that the packet arrived at the receiving node 300 (based on the receiving node's clock). As such, this smoothed time in network also serves to correlate the clock at the sending node 200 to the clock at the receiving node 300.

Thus, in certain embodiments, the smoothed time in network is an averaged value based on the time in network values of all packets that were not retransmissions. In other embodiments, a subset of the packets is used to compute the smoothed time in network value. For example, in certain embodiments, the smoothed time in network value may be the average of only the retransmission probes, and may not include all other packets.

As described above, in certain embodiments, the receiving node 300 calculates the time in network for all incoming packets, not just the retransmission probes. This technique may provide a more accurate smoothed time in network value.

In the event of a retransmission, the receiving node 300 again calculates the time in network (as shown above). The receiving node 300 then compares this time with the updated smoothed time in network value. This difference is the delay caused by the retransmission. Further, in certain embodiments, the retransmissions indicate which link was retried, allowing the receiving node to calculate the delay for each particular link in the overlay network. This allows the receiving node to create a database, as shown in FIG. 5, which stores the delay associated with each link in the overlay network. This database may be stored within the calculation block 330 (see FIG. 6). The retransmissions 140*a-c* may then be forwarded to the packet scheduler 340. In the case of intentional retransmissions, as described above, the packet scheduler 340 may simply discard these retransmissions. In certain embodiments, the intentional retransmissions are discarded before being forwarded to the packet scheduler 340.

As described above, in certain embodiments, the receiving node 300 may use averaged or smoothed values, as well as other derived statistics, such as delay variance or maximum delay, to calculate the delay times stored in the database. For example, as explained above, transmission time through the internet may be variable. Therefore, a smoothing function may provide a more accurate representation of the delay associated with each link.

Thus, by transmitting retransmission probes, which are normal packets which are specially marked, such as through the use of a special flag set in the header, the receiving node 300 is able to observe the retransmission delay associated with each link in the overlay network. The receiving node 300 can then use this information to determine the optimal buffer time to use.

For example, in certain embodiments, the receiving node 300 may use the largest single link delay to calculate the optimal buffer time. In other embodiments, the receiving node 300 may use the sum of the two largest link delays to calculate the buffer time. Of course, the receiving node 300 may perform other functions based on these delay times to calculate the optimal buffer time.

The receiving node 300 may determine several parameters that are useful for the packet scheduler 340. For example, the smoothed time in network is an indication of the relative time difference between the sending node 200 and the receiving node 300. This value includes average transmission time and the skew between the sending node clock and the receiving node clock. Additionally, the values stored in the database are representative of the delays through the overlay network. Based on these delay values, the receiving node 300 may determine a delay factor, which is a function of the link delays that are computed and stored in the database. By adding the smoothed time in network value to the delay factor, an optimal buffer time may be determined. In other embodiments, the delay factor may be used in conjunction with other parameters to determine the optimal buffer time. This optimal buffer time dictates the operation of the packet scheduler 340. For example, the packet scheduler 340 may transmit packets based on the sending node's timestamp. When the sending node's timestamp, plus the optimal buffer time, is equal to the present time (as determined by the sending node), the packet scheduler 340 transmits the packet.

Thus, the use of specially marked packets allows the characterization of delays through the overlay network. According to one embodiment, the delay may be characterized by performing the following steps:

transmit a specially marked packet from a sending node to a receiving node through the overlay network, where the overlay network comprises a plurality of overlay nodes connecting by a plurality of links, wherein the packet is marked as a retransmission probe;

receive the specially marked packet at a second overlay node from a first overlay node in the overlay network;

forward the specially marked packet from the second overlay node and request retransmission of the specially marked packet to the second overlay node from the first overlay node;

receive the retransmitted packet from the first overlay node at the second overlay node;

forward the retransmitted packet from the second overlay node;

receive the specially marked packet and the retransmitted packet at the receiving node;

determine, at the receiving node, a difference between a smoothed time in network and the time in network of the retransmitted packet; and calculate, at the receiving node, the delay associated with retransmission of packets between the first overlay node and the second overlay node.

Portions of this process may be performed by each overlay node that is in the path of the retransmission probe. For example, the receive and forward steps described above may be performed by each overlay node. Thus, the receiving node would receive a number of packets equal to one more than the number of links traversed by the original specially marked packet.

The sending node 200 executes a portion of this sequence. Specifically, the sending node 200 executes the following sequence:

transmits a specially marked packet to a receiving node through the overlay network, where the overlay network comprises a plurality of overlay nodes connecting by a plurality of links, wherein the packet is marked as a retransmission probe;

receives a request for retransmission from the next overlay node (if the sending node is an overlay node);

modifies the retransmission to include an indication of the link and removes the special marking(if the sending node is an overlay node); and sends a retransmission to the overlay node that requested retransmission(if the sending node is an overlay node).

In certain embodiments, the receiving node 300 is an overlay node that also requests retransmissions. The receiving node 300 executes that following sequence:

receive the specially marked packet at a receiving node from a previous overlay node in the overlay network;

request retransmission of the specially marked packet to the receiving node from the previous overlay node;

receive the retransmitted packet from the previous overlay node at the receiving node;

determine, at the receiving node, a difference between the smoothed time in network and the time in network of the retransmitted packet; and calculate, at the receiving node, the delay associated with retransmission of packets between each overlay node in the overlay network.

This process may be repeated for each overlay node that is in the path of the retransmission probe. Thus, the receiving node would receive a number of packets equal to one more than the number of links traversed by the original specially marked packet.

Each overlay node 110*a-g* comprises at least one network interface to allow it to receive and transmit packets over the overlay network. Additionally, each overlay node 110*a-g* comprises a processing unit in communication with a suitable memory device. The memory device may include instructions, which when executed by the overlay node, allow it to performed the functions described herein and shown in FIGS. 4A-4B.

Thus, the present disclosure discloses a method by which a receiving node can determine an optimized buffer time for the presentation of time sensitive information transmitted over an overlay network. The receiving node first calculates the delay associated with retries at each link in the overlay network. Then, using this delay information, the receiving node determines an optimized buffer time.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of characterizing the delay through an overlay network comprising:
    transmitting a specially marked packet from a sending node to a receiving node through the overlay network, comprising a plurality of overlay nodes connecting by a plurality of links, wherein the packet is marked as a retransmission probe;
    receiving the specially marked packet at a second overlay node from a first overlay node in the overlay network;
    forwarding the specially marked packet from the second overlay node to a third node and requesting retransmission of the specially marked packet to the second overlay node from the first overlay node;
    receiving the retransmitted packet sent from the first overlay node at the second overlay node;
    forwarding the retransmitted packet to the third node;
    receiving the specially marked packet and the retransmitted packet at the receiving node;
    determining, at the receiving node, a difference between a smoothed time in network and a time in network of the retransmitted packet, wherein the smoothed time in network is a measure of an average time in network; and
    calculating the delay associated with retransmission of packets between the first overlay node and the second overlay node.

2. The method of claim 1, wherein each overlay node requests retransmissions from a previous overlay node and forwards the specially marked packet.

3. The method of claim 1, wherein the first overlay node modifies the retransmitted packet to include an indication of the link that is being retried.

4. The method of claim 1, wherein the receiving node receives a predetermined number of packets, wherein the predetermined number is one more than the number of links traversed by the specially marked packet.

5. The method of claim 4, wherein the first overlay node modifies the retransmitted packet to include an indication of the link that is being retried and wherein the receiving node calculates a delay associated with each link traversed by the specially marked packet.

6. The method of claim 5, wherein the delay is based on the difference between a smoothed time in network and the time in network of the retransmitted packet.

7. The method of claim 6, wherein the receiving node uses the delays calculated for each link to determine a buffer time.

8. The method of claim 1, wherein the first overlay node removes the special marking from the packet prior to retransmission.

9. The method of claim 1, wherein the first overlay node is the sending node.

10. A method of determining an optimized buffer time for time sensitive information delivered over an overlay network, the overlay network comprising a plurality of overlay nodes connected by links, comprising:
    calculating, at a receiving node, a delay of retransmission associated with each link in the overlay network using the method of claim 1, and
    using the calculated delays to determine the optimized buffer time.

11. The method of claim 1, wherein the third node comprises the receiving node.

12. The method of claim 1, wherein the third node comprises a node in the overlay network disposed between the second overlay node and the receiving node.

* * * * *